United States Patent
Matsueda et al.

(10) Patent No.: US 9,789,469 B2
(45) Date of Patent: Oct. 17, 2017

(54) EXHAUST GAS-PURIFYING CATALYST AND EXHAUST GAS-PURIFYING CATALYST MATERIAL

(71) Applicant: Cataler Corporation, Kakegawa-shi, Shizuoka (JP)

(72) Inventors: Satoshi Matsueda, Kakegawa (JP); Akimasa Hirai, Kakegawa (JP); Kenichi Taki, Kakegawa (JP); Yuji Yabuzaki, Kakegawa (JP); Sho Hoshino, Kakegawa (JP)

(73) Assignee: CATALER CORPORATION, Kakegawa-shi, Shizuoka (JP)

( * ) Notice: Subject to any disclaimer, the term of this patent is extended or adjusted under 35 U.S.C. 154(b) by 0 days.

(21) Appl. No.: 15/434,627

(22) Filed: Feb. 16, 2017

(65) Prior Publication Data
US 2017/0239646 A1    Aug. 24, 2017

(30) Foreign Application Priority Data
Feb. 19, 2016 (JP) ................................. 2016-030100

(51) Int. Cl.
*B01J 21/06* (2006.01)
*B01J 21/08* (2006.01)
(Continued)

(52) U.S. Cl.
CPC ............ *B01J 23/63* (2013.01); *B01D 53/944* (2013.01); *B01D 2255/1021* (2013.01);
(Continued)

(58) Field of Classification Search
CPC ........ B01J 21/06; B01J 21/063; B01J 21/066; B01J 21/08; B01J 23/10; B01J 23/40;
(Continued)

(56) References Cited

U.S. PATENT DOCUMENTS 8,318,632 B2 * 11/2012 Matsueda ............ B01D 53/945
502/262
8,546,296 B2 * 10/2013 Yabuzaki ............. B01D 53/945
423/213.5
(Continued)

FOREIGN PATENT DOCUMENTS

JP    H01-242149 A    9/1989
JP    H10-202101 A    8/1998
(Continued)

*Primary Examiner* — Cam N. Nguyen
(74) *Attorney, Agent, or Firm* — John P. White; Cooper & Dunham LLP

(57) ABSTRACT

An exhaust gas-purifying catalyst material includes first oxide particles having an average particle diameter $D_{av}$ of 1 μm to 95 μm and having an oxygen storage capacity, second oxide particles having an average particle diameter $D_{av}$ of 0.05 μm to 0.5 μm, containing a metal element, and having no oxygen storage capacity, precious metal particles, and acidic oxide particles. The material has a correlation coefficient ρ of 0.45 or more obtained using first characteristic X-ray intensity for the metal element contained in the second oxide particle, second characteristic X-ray intensity for an element other than oxygen contained in the acidic oxide particle, and third characteristic X-ray intensity for a precious metal element contained in the precious metal particle.

8 Claims, 2 Drawing Sheets

(51) Int. Cl.

| | |
|---|---|
| *B01J 23/10* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/54* | (2006.01) |
| *B01J 23/63* | (2006.01) |
| *B01J 35/04* | (2006.01) |
| *B01D 53/94* | (2006.01) |

(52) U.S. Cl.
CPC ............... *B01D 2255/1023* (2013.01); *B01D 2255/1025* (2013.01); *B01D 2255/908* (2013.01)

(58) Field of Classification Search
CPC ... B01J 23/42; B01J 23/44; B01J 23/46; B01J 23/54; B01J 23/63; B01J 23/6527; B01J 35/04
See application file for complete search history.

(56) References Cited

U.S. PATENT DOCUMENTS

| | | | | |
|---|---|---|---|---|
| 8,569,198 | B2 * | 10/2013 | Hoshino | B01D 53/9422 502/174 |
| 8,580,706 | B2 * | 11/2013 | Matsueda | B01D 53/945 502/327 |
| 8,741,799 | B2 * | 6/2014 | Matsueda | B01D 53/945 502/170 |
| 9,295,945 | B2 * | 3/2016 | Matsueda | B01D 53/945 |
| 9,358,535 | B2 * | 6/2016 | Matsueda | B01D 53/945 |
| 9,364,793 | B2 * | 6/2016 | Matsueda | B01D 53/945 |
| 2011/0245076 | A1 * | 10/2011 | Matsueda | B01D 53/945 502/328 |
| 2012/0094827 | A1 | 4/2012 | Matsueda et al. | |

FOREIGN PATENT DOCUMENTS

| | | |
|---|---|---|
| JP | 2004-041866 A | 2/2004 |
| JP | 2004-041867 A | 2/2004 |
| JP | 2004-041868 A | 2/2004 |

* cited by examiner

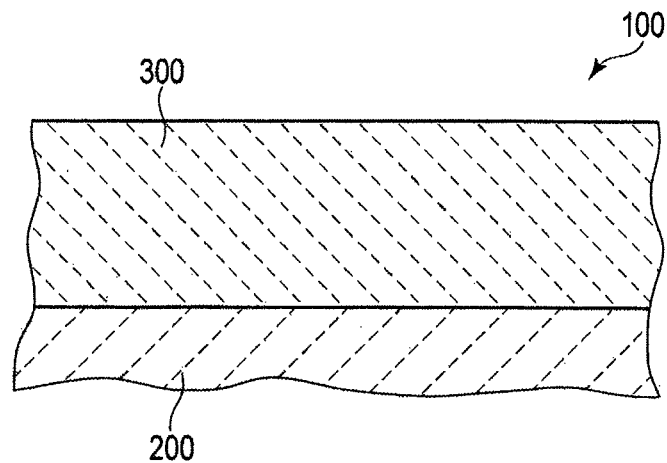
F I G. 1
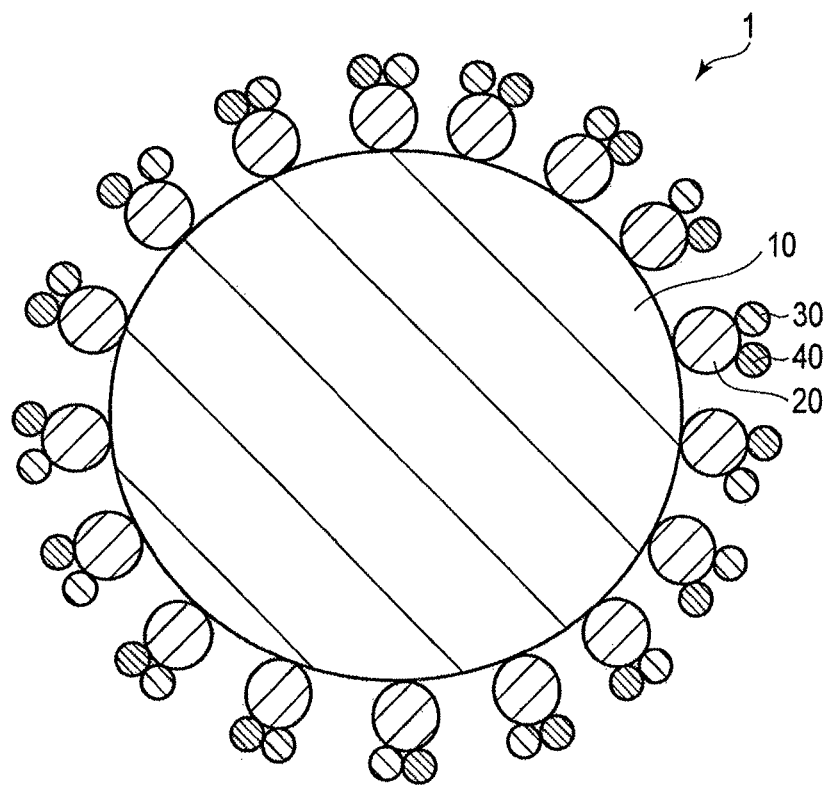
F I G. 2

EXHAUST GAS-PURIFYING CATALYST AND EXHAUST GAS-PURIFYING CATALYST MATERIAL

CROSS-REFERENCE TO RELATED APPLICATIONS

This application is based upon and claims the benefit of priority from Japanese Patent Applications No. 2016-030100, filed Feb. 19, 2016, the entire contents of which are incorporated herein by reference.

FIELD

The present invention relates to an exhaust gas-purifying technique.

BACKGROUND

An exhaust gas emitted from an internal combustion engine of an automobile, etc. contains hydrocarbons (HC), carbon monoxide (CO), and nitrogen oxides ($NO_x$) or the like. Various exhaust gas-purifying catalysts for purifying these gases have been developed.

For example, Jpn. Pat. Appln. KOKAI Publication No. 01-242149 describes an exhaust gas-purifying catalyst containing an activated alumina cover layer. The activated alumina cover layer is formed using slurry containing activated alumina and at least one of nickel oxide and cobalt oxide. The activated alumina cover layer is loaded with a composite oxide of cerium oxide and zirconium oxide by impregnating the activated alumina cover layer with an aqueous solution containing a cerium salt and a zirconium salt, and heat-treating the activated alumina cover layer. The activated alumina cover layer is further loaded with one or more precious metals selected from the group consisting of platinum, palladium, and rhodium by impregnating the activated alumina cover layer with an aqueous solution containing a precious metal salt, and heat-treating the activated alumina cover layer.

Jpn. Pat. Appln. KOKAI Publication No. 10-202101 describes adding an alkaline solution and hydrogen peroxide to a solution containing cerium ion, aluminum ion, and zirconium ion to prepare a suspension in which a precursor of a composite oxide is dispersed, adding a carrier having a large specific surface area such as alumina or titania to the suspension, and firing the mixture to obtain a composite in which the composite oxide is supported by the carrier. This Literature also describes that the solution may contain one or more additives selected from alkali metal elements, alkaline-earth metal elements, and rare-earth elements and that the solution may contain one or more precious metal elements and/or one or more transition metal elements such as iron, nickel, molybdenum, and cobalt and the like.

Jpn. Pat. Appln. KOKAI Publication Nos. 2004-041866, 2004-041867, and 2004-041868 describe exhaust gas-purifying catalysts each containing a perovskite-type composite oxide. The perovskite-type composite oxide described in Jpn. Pat. Appln. KOKAI Publication No. 2004-041866 is represented by the general formula $ABPdO_3$. The perovskite-type composite oxide described in Jpn. Pat. Appln. KOKAI Publication No. 2004-041867 is represented by the general formula $ABRhO_3$. The perovskite-type composite oxide described in Jpn. Pat. Appln. KOKAI Publication No. 2004-041868 is represented by the general formula $A_{1-x}A'_xB_{1-y-z}B'_yPt_zO_3$.

SUMMARY

An object of the present invention is to provide a technique by which excellent exhaust gas-purifying performance can be achieved.

According to a first aspect of the present invention, there is provided an exhaust gas-purifying catalyst material comprising first oxide particles having an average particle diameter $D_{av}$ of 1 μm to 95 μm and having an oxygen storage capacity, second oxide particles having an average particle diameter $D_{av}$ of 0.05 μm to 0.5 μm, containing a metal element, and having no oxygen storage capacity, precious metal particles, and acidic oxide particles, wherein the exhaust gas-purifying catalyst material has a correlation coefficient ρ of 0.45 or more, the correlation coefficient ρ being calculated from the following formula (1) using first characteristic X-ray intensity for the metal element contained in the second oxide particle, second characteristic X-ray intensity for an element other than oxygen contained in the acidic oxide particle, and third characteristic X-ray intensity for a precious metal element contained in the precious metal particle each obtained through characteristic X-ray measurement by energy dispersive X-ray spectroscopic method on a 500 nm-length straight section on the exhaust gas-purifying catalyst material:

$$\rho = \frac{C(SP, AC/PM)}{\sigma(SP) \times \sigma(AC/PM)} \quad (1)$$

wherein in the formula (1), the covariance $C(SP,AC/PM)$, standard deviation $\sigma(SP)$, and standard deviation $\sigma(AC/PM)$ are calculated from to the following formulae (2), (3), and (4), respectively, $$C(SP, AC/PM) = \frac{1}{n}\sum_{m=1}^{n}\left\{[I_{SP}(m) - I_{SP}(AV)] \times \left[\frac{I_{AC}(m)}{I_{PM}(m)} - \frac{I_{AC}(AV)}{I_{PM}(AV)}\right]\right\} \quad (2)$$

$$\sigma(SP) = \sqrt{\frac{1}{n}\sum_{m=1}^{n}[I_{SP}(m) - I_{SP}(AV)]^2} \quad (3)$$

$$\sigma(AC/PM) = \sqrt{\frac{1}{n}\sum_{m=1}^{n}\left[\frac{I_{AC}(m)}{I_{PM}(m)} - \frac{I_{AC}(AV)}{I_{PM}(AV)}\right]^2} \quad (4)$$

in the formulae (2) to (4), $I_{SP}(m)$, $I_{AC}(m)$, and $I_{PM}(m)$ respectively represent the first characteristic X-ray intensity, the second characteristic X-ray intensity, and the third characteristic X-ray intensity each obtained for a m-th straight section among 25 straight sections arranged in line in the 500 nm-length straight section and each having a length of 20 nm; $I_{SP}(Av)$, $I_{AC}(Av)$, and $I_{PM}(Av)$ respectively represent an average value of the first characteristic X-ray intensities, an average value of the second characteristic X-ray intensities, and an average value of the third characteristic X-ray intensities obtained for the 500 nm-length straight section; and n is 25.

According to a second aspect of the present invention, there is provided an exhaust gas-purifying catalyst comprising:

a substrate; and a catalytic layer provided on the substrate and containing the exhaust gas-purifying catalyst material according to the first aspect.

BRIEF DESCRIPTION OF THE DRAWING(S)

FIG. 1 is a sectional view schematically showing a part of an exhaust gas-purifying catalyst according to an embodiment of the present invention;

FIG. 2 is a sectional view schematically showing an exhaust gas-purifying catalyst material contained in the exhaust gas-purifying catalyst of FIG. 1.

DETAILED DESCRIPTION

Figure 3:
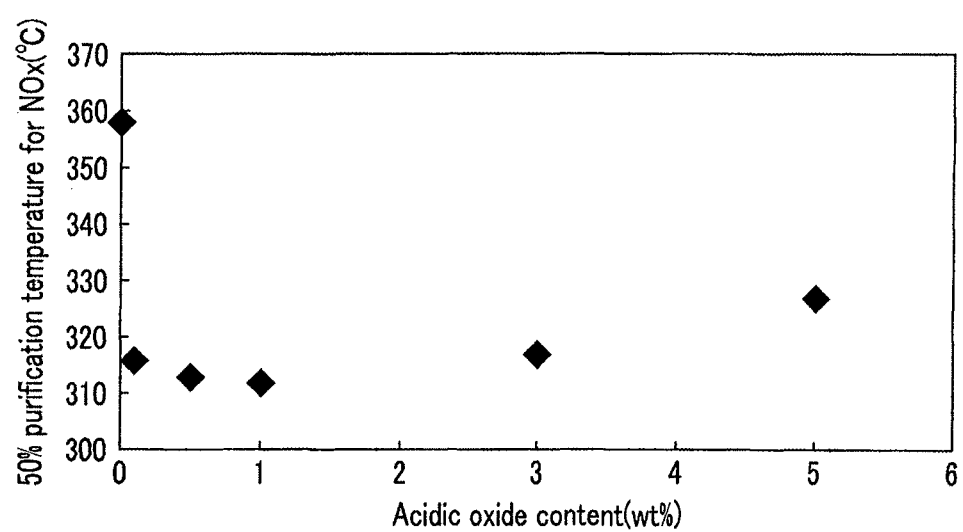
FIG. 3 is a graph showing an example of the relationship between the content of an acidic oxide and a 50% purification temperature for $NO_x$.

Embodiments of the present invention will be described below with reference to the drawings. The term "composite oxide" means that a plurality of oxides form a solid solution rather than that the plurality of oxides are merely mixed physically.

FIG. 1 is a sectional view schematically showing a part of an exhaust gas-purifying catalyst according to an embodiment of the present invention. FIG. 2 is a sectional view schematically showing an exhaust gas-purifying catalyst material contained in the exhaust gas-purifying catalyst of FIG. 1.

The exhaust gas-purifying catalyst 100 shown in FIG. 1 includes a substrate 200 and a catalytic layer 300 provided on the substrate 200.

As the substrate 200, for example, a monolith honeycomb-type substrate is used. Typically, the substrate is made of ceramic such as cordierite. Examples of the exhaust gas-purifying catalyst include a monolithic catalyst.

The catalytic layer 300 contains an exhaust gas-purifying catalyst material 1 shown in FIG. 2. The catalytic layer 300 can further contain other materials such as alumina, zirconia, ceria, and barium oxide. The catalytic layer 300 may have a single layer structure, or may have a multilayer structure.

The exhaust gas-purifying catalyst material 1 contains first oxide particles 10, second oxide particles 20, precious metal particles 30, and acidic oxide particles 40.

The first oxide particles 10 have an oxygen storage capacity. Namely, a first oxide constituting the first oxide particles 10 has an oxygen storage capacity. The first oxide stores oxygen under an oxygen-rich condition and emits oxygen under an oxygen-lean condition so as to optimize the oxidation reactions of HC and CO and the reductive reactions of $NO_x$. Namely, the first oxide has a role in storing and emitting oxygen in the exhaust gas to reduce a variation in the air-fuel ratio of the exhaust gas.

As the first oxide, for example, an oxide containing cerium is used. Typically, a composite oxide of cerium oxide and zirconium oxide is used as the first oxide.

The first oxide may be a composite oxide further containing a rare-earth element other than cerium. As the rare-earth element other than the cerium, yttrium, neodymium, lanthanum, and praseodymium, or two or more of them are used. The rare-earth elements allow the exhaust gas-purifying catalyst material 1 to improve the $NO_x$-purifying performance without deteriorating the HC-purifying performance thereof.

The average particle diameter $D_{av}$ of the first oxide particles 10 is within a range of 1 μm to 95 μm, preferably within a range of 5 μm to 60 μm, and more preferably within a range of 10 μm to 30 μm. When the average particle diameter $D_{av}$ is too small, the aggregation of the second oxide particles 20 becomes easy to occur, which may cause deterioration in the endurance of exhaust gas-purifying catalyst material 1. When the average particle diameter $D_{av}$ is too large, it becomes difficult to uniformly disperse the second oxide particles 20 on the first oxide particle 10, which may cause deterioration in the endurance of the exhaust gas-purifying catalyst material 1.

The "average particle diameter $D_{av}$" of the first oxide particles 10 is determined as follows. First, a sample is placed on a stage of a scanning electron microscope (SEM). The sample is observed, for example, at 2,500-fold to 50,000-fold magnification to obtain an SEM image. Among the first oxide particles in the SEM image, the particles each including no portion that cannot be observed due to another particle overlying thereon are selected, and an area $A_k$ of each selected particle is measured (k=1, 2, . . . , n; n is the number of the first oxide particles in the SEM image each of which includes no portion that cannot be observed due to another particle overlying thereon). Then, equivalent circle diameters $d_k$ corresponding to the areas $A_k$ are obtained. That is, the particle diameters $d_k$ satisfying the following formula (5) are obtained. Thereafter, the arithmetical average value of the particle diameters $d_k$ is calculated to obtain the particle diameter corresponding to the SEM image.

$$A_k = \pi \times \left(\frac{d_k}{2}\right)^2 \qquad (5)$$

The same SEM observations as that described above are performed at 100 positions on the sample selected randomly. Then, the particle diameters are obtained for the respective SEM images by the above-described method, and an arithmetical average value is calculated therefrom. Thus, the average particle diameter $D_{av}$ is obtained.

The second oxide particles 20 are supported by the first oxide particles 10. The second oxide particles 20 partially or entirely cover the surfaces of the first oxide particles 10.

The second oxide particles 20 have no oxygen storage capacity. Namely, a second oxide constituting the second oxide particles 20 is an oxide having no oxygen storage capacity. As the second oxide, for example, an oxide which does not contain cerium but contains zirconium is used. Typically, as the second oxide, a composite oxide of zirconium and a rare-earth element other than cerium is used. As the rare-earth element, for example, yttrium, neodymium, lanthanum, praseodymium or a combination of two or more of them is used.

It is preferable that the second oxide particles 20 partially cover the surfaces of the first oxide particles 10 for the following reasons. For example, when a plurality of second oxide particles 20 are supported by a single first oxide particle 10, typically, at least two of the second oxide particles 20 are not in contact with each other. In this case, even if the exhaust gas-purifying catalyst material 1 is used for a long period of time, the sintering or aggregating of the second oxide particles 20 on the first oxide particle 10 is less prone to occur. Therefore, in this case, contacts among the precious metal particles 30 supported by the second oxide particles 20 are less prone to occur. Accordingly, in this case, deterioration in catalytic activity due to the sintering or aggregating of the precious metal particles 30 is less prone to occur.

The average particle diameter $D_{av}$ of the second oxide particles 20 is smaller than the average particle diameter $D_{av}$ of the first oxide particles 10. Accordingly, a distance between the first oxide particle 10 and the precious metal particles 30 supported by the second oxide particles 20 is relatively short. Therefore, the precious metals can benefit from the effects provided by the oxygen storage capacity of the first oxide efficiently. Namely, the precious metals can exhibit an ability to promote an exhaust purification reaction in an optimal or nearly optimal air-fuel ratio.

The average particle diameter $D_{av}$ of the second oxide particles 20 is determined by the same method as that described for the average particle diameter $D_{av}$ of the first oxide particles 10 except that magnification during observation by SEM is within a range of 50,000-fold to 250,000-fold. The average particle diameter $D_{av}$ of the second oxide particles 20 is within a range of 0.05 μm to 0.5 μm, and preferably within a range of 0.1 μm to 0.3 μm. When the average particle diameter $D_{av}$ is too small, the aggregating of the second oxide particles 20 becomes prone to occur, which may cause deterioration in the endurance of the exhaust gas-purifying catalyst material 1. When the average particle diameter $D_{av}$ is too large, the distance between the first oxide particle 10 and the precious metal particles 30 supported by the second oxide particles 20 becomes relatively long. Accordingly, it becomes difficult for the precious metals to benefit from the effects provided by the oxygen storage capacity of the first oxide efficiently, which may cause deterioration in the exhaust gas-purifying performance of the exhaust gas-purifying catalyst material 1. The average particle diameter $D_{av}$ of the second oxide particles 20 is typically larger than the average particle diameter of the precious metal particles 30.

The ratio of the average particle diameter $D_{av}$ of the second oxide particles 20 to the average particle diameter $D_{av}$ of the first oxide particles 10 is preferably within a range of 0.0005 to 0.5, and more preferably within a range of 0.003 to 0.06. When the ratio is too small, the aggregating of the second oxide particles 20 becomes prone to occur, which may cause deterioration in the endurance of the exhaust gas-purifying catalyst material 1. When the ratio is too small, the distance between the first oxide particle 10 and the precious metal particles 30 supported by the second oxide particles 20 becomes long. Accordingly, it becomes difficult for the precious metals to benefit from the effects provided by the oxygen storage capacity of the first oxide efficiently, which may cause deterioration in the exhaust gas-purifying performance of the exhaust gas-purifying catalyst material 1.

The ratio $M_2/M_1$ of the total amount by mole $M_2$ of elements other than oxygen contained in the second oxide particles 20 to the total amount by mole $M_1$ of elements other than oxygen contained in the first oxide particles 10 is preferably within a range of 1/35 to 25/1 (mol/mol), and more preferably within a range of 1/1 to 10/1 (mol/mol). When the ratio is too small, it becomes difficult to maintain a sufficient amount of precious metals in a high dispersion state, which may cause deterioration in initial performance. When the ratio is too large, the aggregating of the second oxide particles 20 becomes prone to occur, which may cause deterioration in the endurance of the exhaust gas-purifying catalyst material 1.

The precious metal particles 30 are supported by the second oxide particles 20. All the precious metal particles 30 may be supported by the second oxide particles 20. Alternatively, parts of the precious metal particles 30 may be supported by the second oxide particles 20, and the remainders may be supported by the first oxide particles 10.

The precious metal particles 30 play a role in promoting HC and CO oxidation reactions and a $NO_x$ reduction reaction. As the precious metal constituting the precious metal particles 30, for example, platinum group elements are used. Typically, as the precious metals, rhodium, platinum, palladium, or a combination of two or more of them is used.

In FIG. 3, for the purpose of simplification, each of the second oxide particles 20 supporting only one precious metal particle 30 is drawn. However, each of the second oxide particles 20 usually supports a number of precious metal particles 30. Typically, the precious metal particles 30 are spaced apart from each other such that the precious metal particles 30 are almost uniformly distributed on the second oxide particles 20.

The average particle diameter $D_{av}$ of the precious metal particles 30 is preferably within a range of 0.5 nm to 10 nm, and more preferably within a range of 1 nm to 5 nm. When the average particle diameter $D_{av}$ is too small, the precious metals become easy to evaporate, which may cause deterioration in the durability of the exhaust gas-purifying catalyst material 1. When the particle diameter is too large, the specific surface area of the precious metal particles 30 becomes small, which may cause deterioration in the exhaust gas-purifying performance of the exhaust gas-purifying catalyst material 1.

The average particle diameter $D_{av}$ of the precious metal particles 30 is measured by the method described below. Specifically, a sample is first placed on a stage of a scanning transmission electron microscope equipped with energy dispersive X-ray fluorescence analyzer (STEM-EDS). This is observed, for example, at 1,000,000-fold to 5,000,000-fold magnification to obtain an STEM-EDS image. Among the precious metal particles in the STEM-EDS image, the particles each including no portion that cannot be observed due to another particle overlying thereon are selected, and an area $A_k$ of each selected particle is measured (k=1, 2, . . . , n; n is the number of the precious metal particles in the image each of which includes no portion that cannot be observed due to another particle overlapping thereon). Then, equivalent circle diameters $d_k$ corresponding to the areas $A_k$ are obtained. That is, the particle diameters $d_k$ satisfying the above formula (5) are obtained. Thereafter, the arithmetical average value of the particle diameters $d_k$ is calculated to obtain the particle diameter corresponding to the above image.

The same SEM observations as that described above are performed at 50 positions selected randomly. Then, the particle diameters are obtained for the respective images by the above-described method, and an arithmetical average value is calculated therefrom. Thus, the average particle diameter $D_{av}$ is obtained. The constituent elements of the second oxide other than oxygen are less prone to cause change in the oxidation number associated with variation of the composition of atmosphere as compared with the constituent elements of the first oxide other than oxygen. Accordingly, in the case where the precious metal particles 30 are supported by the second oxide particles 20, the oxidation of the precious metals is less prone to occur as compared with the case where the precious metal particles 30 are supported by the first oxide particles 10. Namely, in the former case, the precious metals tend to keep a zerovalent metal state with high catalytic activity as compared with the latter case. Therefore, the precious metal particles 30 supported by the second oxide particles 20 maintain high catalytic activity over a relatively long period of time.

According to an example, most of the precious metal particles 30 are supported by the second oxide particles 20 in the exhaust gas-purifying catalyst material 1. In this case, most of the precious metal particles 30 are not in contact with the first oxide particles 10 in which a change in the oxidation number of the constituent elements is relatively prone to occur. Accordingly, deterioration in catalytic activity of the precious metal particles 30 due to oxidation is hard to occur.

The proportion of the precious metals supported by the second oxide particles 20 in the precious metals contained in the exhaust gas-purifying catalyst material 1 is preferably 50% by mass or more. Namely, it is preferable that the first oxide particles 10 support no precious metal particles 30, or the first oxide particles 10 support the precious metal particles 30 in an amount lower than the total amount of the precious metal particles 30 supported by the second oxide particles 20. This allows further deterioration in the performance due to the oxidation of the precious metals to be less prone to occur. The proportion is more preferably 70% by mass or more, and still more preferably 99% by mass or more.

The amount of the precious metals contained in the exhaust gas-purifying catalyst material 1 is preferably within a range of 0.1% by mass to 10% by mass, more preferably within a range of 0.3% by mass to 5% by mass, and still more preferably within a range of 0.4% by mass to 0.6% by mass based on the mass of the exhaust gas-purifying catalyst material 1.

The amount of the precious metals supported by the second oxide particles 20 is preferably within a range of 0.1% by mass to 10% by mass, more preferably within a range of 0.3% by mass to 5% by mass, and still more preferably within a range of 0.4% by mass to 0.6% by mass based on the mass of the exhaust gas-purifying catalyst material 1. When the amount is too small, the amount of the precious metals which can be introduced into the unit mass of the exhaust gas-purifying catalyst material 1 is decreased, which may cause deterioration in its initial performance. When the amount is too large, the dispersibility of the precious metal particles 30 is deteriorated, which may make the aggregating of the precious metal particles 30 prone to occur. Therefore, the purifying performance commensurate with the content of the precious metals may not be obtained.

The acidic oxide particles 40 are supported by the second oxide particles 20. An acidic oxide constituting the acidic oxide particles 40 suppresses the poisoning of the precious metals by sulfur. The acidic oxide particles 40 may contain only one acidic oxide, or may contain two or more acidic oxides. As the acidic oxide, for example, titanium oxide, silicon oxide, or tungsten oxide can be used.

Parts of the acidic oxide particles 40 may be supported by the second oxide particles 20, and other parts of the acidic oxide particles 40 may be supported by the first oxide particle 10. The number of the acidic oxide particles 40 supported by each second oxide particle 20 may be 1 or 2 or more, but each of the second oxide particles 20 usually supports a number of the acidic oxide particles 40.

The poisoning of the precious metals by sulfur can be suppressed by making the acidic oxide particles 40 supported by the second oxide particles together with the precious metal particles 30. Therefore, the purifying performance of the exhaust gas-purifying catalyst material 1 can be maintained for a longer period of time.

According to one example, the average particle diameter $D_{av}$ of the acidic oxide particles 40 is smaller than the average particle diameter $D_{av}$ of the second oxide particles 20. Such acidic oxide particles 40 are easily supported and distributed on the second oxide particles 20, and thus it is easy to obtain a structure in which the acidic oxide particles 40 are in contact with the precious metal particles 30.

The average particle diameter $D_{av}$ of the acidic oxide particles 40 is preferably within a range of 30 nm to 100 nm, and more preferably within a range of 30 nm to 50 nm. When the particle diameter is too small, the aggregating of the acidic oxide particles 40 becomes easy to occur, which makes it difficult to obtain an effect of suppressing the poisoning of the precious metals by sulfur. When the particle diameter is too large, it becomes difficult to obtain an effect of suppressing the poisoning of the precious metals by sulfur. The average particle diameter $D_{av}$ of the acidic oxide particles 40 is obtained by the same method as that described for the average particle diameter $D_{av}$ of the first oxide particles 10 except that magnification during observation by SEM is within a range of 50,000-fold to 250,000-fold.

The amount of the acidic oxide contained in the exhaust gas-purifying catalyst material 1 is preferably within a range of 0.1% by mass to 5% by mass, and more preferably within a range of 0.1% by mass to 3% by mass based on the mass of the exhaust gas-purifying catalyst material 1. When the content is too small, the amount of the acidic oxide which can be introduced into the unit mass of the exhaust gas-purifying catalyst material 1 is decreased, which may make it difficult to obtain an effect of suppressing the poisoning of the precious metals by sulfur. When the content is too large, the heat resistance of the second oxide particles 20 is deteriorated, and the aggregating of the precious metals occurs, which may cause deterioration in performance.

The surfaces of the first oxide particles 10 are covered with the second oxide particles 20. Alternatively, the surfaces of the first oxide particles 10 are covered with the second oxide particles 20 and the acidic oxide particles 40.

The proportion (coverage) of a region covered with the second oxide particles 20 or the acidic oxide particles 40 in the entire surface of the first oxide particle is preferably within a range of 34% to 98%, more preferably within a range of 40% to 95%, and still more preferably within a range of 50% to 90%.

When the coverage is too small, the oxygen storage capacity of the first oxide particle 10 may not be used effectively. When the coverage is too large, for example, in the case where conditions for use of the exhaust gas-purifying catalyst material 1 become severe, the aggregating of the second oxide particles 20 may become relatively easy to occur. Accordingly, the performance of the exhaust gas-purifying catalyst material 1 may be deteriorated.

The coverage, that is, the proportion of the surface of the first oxide particle 10 covered with the second oxide particles 20 and the acidic oxide particles 40 is determined as follows. First, the exhaust gas-purifying catalyst material 1 is subjected to surface observation using SEM. Specifically, the surface of the first oxide particle 10 contained in the exhaust gas-purifying catalyst material 1 is observed at 2,500-fold to 50,000-fold magnification.

Then, in the obtained SEM image, an area S1 of regions which are occupied by the first oxide particles 10 (including portions covered with the second oxide particles 20 and the acidic oxide particles 40) is determined. Similarly, in the obtained SEM image, an area S2 of regions which are occupied by the second oxide particles 20 covering the surface of the first oxide particles 10 is determined. Similarly, in the SEM image, an area S3 of regions which are occupied by the acidic oxide particles 40 covering the surface of the first oxide particles 10 is determined.

The above-described SEM observations are performed at 100 positions selected at random. For each of the positions, the areas S1, S2, and S3 are measured and the coverage $S_{cov}$ (%) is calculated by the formula (6) below. Then, the obtained values are arithmetically averaged. Thus, the coverage $S_{cov}$ (%) of the surface of the first oxide particles 10 is determined.

$$S_{cov} = \frac{S2 + S3}{S1} \times 100 \quad (6)$$

In the exhaust gas-purifying catalyst material 1, the acidic oxide particles 40 supported by the second oxide particles 20 are preferably in contact with the precious metal particles 30. Herein, the acidic oxide particle 40 being in contact with the precious metal particle 30 mean that at least a part of the surface of the acidic oxide particle 40 is in contact with at least a part of the surface of the precious metal particle 30.

The degree of contact between the acidic oxide particles 40 and the precious metal particles 30 which are supported by the second oxide particles 20 can be evaluated based on the correlation coefficient for a metal element contained in the second oxide particles 20, an element other than oxygen contained in the acidic oxide particles 40, and a precious metal element contained in the precious metal particles. The correlation coefficient value closer to +1 means that the degree of contact between the particles is higher. In the exhaust gas-purifying catalyst material 1 of the present invention, the correlation coefficient is 0.45 or more.

The correlation coefficient is determined as follows.

First, intensity of characteristic X-ray is measured on any of the metal elements contained in the second oxide particles 20, any of the elements other than oxygen contained in the acidic oxide particles 40, and any of the precious metal elements contained in the precious metal particles 30 by an energy dispersive X-ray spectroscopic method. Specifically, a scanning electron microscope (FE-SEM/EDX) equipped with an X-ray analyzer is used for the measurement. Observation is performed at 100,000-fold magnification, and line analysis is performed on a straight section having a length of 500 nm. The intensity of characteristic X-ray obtained for the metal elements contained in the second oxide particles 20, the intensity of characteristic X-ray obtained for the elements other than oxygen contained in the acidic oxide particles 40, and the intensity of characteristic X-ray obtained for the precious metal elements contained in the precious metal particles 30 are respectively referred to as first characteristic X-ray intensity, second characteristic X-ray intensity, and third characteristic X-ray intensity.

Subsequently, the correlation coefficient ρ is calculated according to the following formula (1) using the obtained measured values. The correlation coefficient ρ is a Pearson's product-moment correlation coefficient.

$$\rho = \frac{C(SP, AC/PM)}{\sigma(SP) \times \sigma(AC/PM)} \quad (1)$$

In the formula (1), a covariance C(SP,AC/PM), standard deviation σ(SP), and standard deviation σ(AC/PM) are calculated according to the following formulae (2), (3), and (4), respectively, $$C(SP, AC/PM) = \frac{1}{n}\sum_{m=1}^{n}\left\{[I_{SP}(m) - I_{SP}(AV)] \times \left[\frac{I_{AC}(m)}{I_{PM}(m)} - \frac{I_{AC}(AV)}{I_{PM}(AV)}\right]\right\} \quad (2)$$

$$\sigma(SP) = \sqrt{\frac{1}{n}\sum_{m=1}^{n}[I_{SP}(m) - I_{SP}(AV)]^2} \quad (3)$$

$$\sigma(AC/PM) = \sqrt{\frac{1}{n}\sum_{m=1}^{n}\left[\frac{I_{AC}(m)}{I_{PM}(m)} - \frac{I_{AC}(AV)}{I_{PM}(AV)}\right]^2} \quad (4)$$

In the formulae (2) to (4), $I_{SP}(m)$, $I_{AC}(m)$, and $I_{PM}(m)$ respectively represent the first characteristic X-ray intensity, the second characteristic X-ray intensity, and the third characteristic X-ray intensity obtained for a m-th straight section among 25 straight sections arranged in line and each having a length of 20 nm in the line analysis by FE-SEM/EDX performed on a length of 500 nm. $I_{SP}(Av)$, $I_{AC}(Av)$, and $I_{PM}(Av)$ represent an average value of the first characteristic X-ray intensities, an average value of the second characteristic X-ray intensities, and an average value of the third characteristic X-ray intensities obtained for the length of 500 nm, respectively. n is 25.

As described above, the correlation coefficient ρ can be used as an index showing the degree of contact between the acidic oxide particles 40 and the precious metal particles 30 which are supported by the second oxide. particles 20 in the exhaust gas-purifying catalyst material 1. A correlation coefficient ρ close to 1 indicates that the percentage of the precious metal particles 30 located close to the acidic oxide particles 40 among the precious metal particles 30 supported by the second oxide particles 20 is high. When the correlation coefficient ρ is too small, the percentage of the precious metal particles 30 in contact with the acidic oxide particles 40 is low, which makes it difficult to obtain the effect of the acidic oxide on suppressing the poisoning of the precious metals by sulfur. The correlation coefficient ρ is preferably 0.60 or more, and more preferably is 0.70 or more.

As described above, in the exhaust gas-purifying catalyst material 1, the percentage of the precious metal particles 30 located close to the acidic oxide particles 40 among the precious metal particles 30 is high. Accordingly, the poisoning of the precious metals by sulfur can be effectively suppressed.

The above-described exhaust gas-purifying catalyst material is produced as follows, for example.

First, first composite particles each containing a precious metal and a second oxide supporting the precious metal is produced. Specifically, for example, a dispersion containing second oxide particles and a solution containing a salt or complex of precious metals are mixed together to allow the second oxide particles adsorb the precious metals or compounds thereof. Thus, the first composite particles are produced.

Subsequently, the first composite particles are loaded with first oxide particles. Specifically, for example, a dispersion containing the first composite particles and the first oxide particles are prepared. Subsequently, the dispersion is subjected to drying and firing treatments. Thus, second composite particles each containing the first oxide particle and the first composite particles supported thereby are obtained. Citric acid may be added to the dispersion. By adding citric acid, the dispersibility of the first composite particles can be improved.

Subsequently, an acidic oxide or a precursor thereof is deposited on the second composite particles. Specifically, a solution containing a raw material of acidic oxide particles is added into the dispersion containing the second composite particle, for example. The reaction of the raw material is induced to allow a reaction product deposit on the second composite particles. Then, the obtained solid is separated out by filtration to obtain a filter cake, and the filter cake is subjected to drying and firing treatments. Thus, the exhaust gas-purifying catalyst material as described above is obtained.

In the exhaust gas-purifying catalyst material obtained by the method, precious metal particles are supported substantially only by the second oxide particles among the first and second oxide particles. Namely, the precious metal particles are supported by the second oxide particles except for the precious metal particles inevitably adhering on the first oxide particle by the leaving of the precious metal particles from the second oxide particles, or the like. Typically, in the exhaust gas-purifying catalyst material, parts of the acidic oxide particles are supported by the second oxide particles, and other parts of the acidic oxide particles are supported by the first oxide particles.

The above-described constitution is excellent as the acidic oxide suppresses the poisoning of the first oxide particles by sulfur, and thus the performance of the exhaust gas-purification catalyst material can be improved.

The exhaust gas-purifying catalyst material may be produced as follows.

First, a second oxide or a precursor thereof is deposited on first oxide particles. Specifically, for example, the first oxide particles and a solution containing a raw material of second oxide particles are mixed together to prepare a dispersion. A base is added to the dispersion, followed by stirring. The reaction of the raw material is induced to allow a reaction product deposit on the first oxide particles. Then, the obtained solid is separated out by filtration to obtain a filter cake, and the filter cake is subjected to drying and firing treatments. Thus, third composite particles in each of which the second oxide particles are supported by the first oxide particle are obtained.

Subsequently, the third composite particles are loaded with the precious metal particles. Specifically, for example, a dispersion containing the third composite particles and a solution containing a salt or complex of a precious metal are mixed together to allow the third composite particles adsorb the precious metal or a compound thereof. Thus, fourth composite particles in each of which the precious metal particles are supported by the third composite particle are produced.

Subsequently, an acidic oxide is deposited on the fourth composite particles. Specifically, for example, a solution containing a raw material of acidic oxide particles is added into a dispersion containing the fourth composite particles. The reaction of the raw material is induced to allow a reaction product deposit on the fourth composite particles. Then, the obtained solid is separated out by filtration to obtain a filter cake, and the filter cake is subjected to drying and firing treatments. Thus, the exhaust gas-purifying catalyst material described above is obtained.

In the exhaust gas-purifying catalyst material obtained by the method, parts of the precious metal particles are typically supported by the second oxide particles, and other parts of the precious metal particles are supported by the first oxide particles. In the exhaust gas-purifying catalyst material, typically, parts of the acidic oxide particles are supported by the second oxide particles, and other parts of the acidic oxide particles are supported by the first oxide particles.

The above-described constitution is excellent as the acidic oxide suppresses the poisoning of the first oxide particles and the precious metal by sulfur and deterioration in OSC performance, and thus the performance of the exhaust gas-purification catalyst material can be further improved.

The exhaust gas-purifying catalyst material may be produced as follows.

First, in the same manner as described above, first composite particles each containing a precious metal and a second oxide supporting the precious metal are produced. Subsequently, an acidic oxide is deposited on the first composite particles. Specifically, for example, a solution containing a raw material of the acidic oxide particles is added into a dispersion containing the first composite particles. At this time, an acid may be added into the dispersion. The reaction of the raw material is induced to allow a reaction product deposit on the second composite particles. Thus, fifth composite particles in each of which the acidic oxide particles are supported by the first composite particle are obtained.

Subsequently, the fifth composite particles are loaded with first oxide particles. Specifically, for example, the first oxide particles are added into a dispersion containing the fifth composite particles, followed by stirring. Then, the dispersion is subjected to drying and firing treatments. Thus, the exhaust gas-purifying catalyst material described above is obtained. To the dispersion, citric acid may be added together with the first oxide particles. By adding the citric acid, the dispersibility of the fifth composite particles can be improved.

In the exhaust gas-purifying catalyst material obtained by the method, precious metal particles are supported by substantially only the second oxide particles among the first and second oxide particles. Namely, the precious metal particles are supported by the second oxide particles except for the precious metal particles inevitably adhering on the first oxide particle by the leaving of the precious metal particles from the second oxide particles, or the like. In the exhaust gas-purifying catalyst material, the acidic oxide particles are also supported by substantially only the second oxide particles among the first and second oxide particles. Namely, the acidic oxide particles are supported by the second oxide particles except for the acidic oxide particles inevitably adhering on the first oxide particle by the leaving of the acidic oxide particles from the second oxide particles, or the like.

This constitution makes it possible to efficiently obtain an effect of the acidic oxide on suppressing the poisoning of the precious metals by sulfur, to further improve the performance of the exhaust gas-purification catalyst material.

The median size D50 of the first oxide particles used in the method is preferably within a range of 1 μm to 100 μm, more preferably within a range of 5 μm to 60 μm, and still more preferably within a range of 10 μm to 30 μm. The "median size D50" means a particle diameter at 50% in a cumulative particle diameter distribution obtained by a laser diffraction-scattering method.

When the median size D50 is too small, the aggregating of the second oxide particles becomes prone to occur, which may cause deterioration in the endurance of the exhaust gas-purifying catalyst material. When the median size D50 is too large, it becomes relatively difficult to uniformly disperse the second oxide particles on the first oxide particle, which may cause deterioration in the endurance of the exhaust gas-purifying catalyst material.

The coverage of the surface of the first oxide particle can be adjusted by changing the median size D50 of the first oxide particles.

The median size D50 of the second oxide particles used in the method is smaller than the median size D50 of the first oxide particles. Specifically, the median size D50 of the second oxide particles is preferably within a range of 0.05 µm to 0.5 µm, and more preferably within a range of 0.1 µm to 0.3 µm. When the particle diameter is too small, the aggregating of the second oxide particles becomes prone to occur, which may cause deterioration in the endurance of the exhaust gas-purifying catalyst material. When the average particle diameter is too large, the distance between the first oxide particles and the precious metal particles supported by the second oxide particles becomes relatively long. Accordingly, it becomes relatively difficult for the precious metals to benefit from the effects provided by the oxygen storage capacity of the first oxide efficiently, which may cause deterioration in the exhaust gas-purifying performance of the exhaust gas-purifying catalyst material. Typically, the median size D50 of the second oxide particles is greater than the average particle diameter of the precious metal particles.

The ratio of the median size D50 of the second oxide particles to the median size D50 of the first oxide particle is preferably within a range of 0.0005 to 0.5, and more preferably within a range of 0.003 to 0.06. When the ratio is too low, the aggregating of the second oxide particles becomes relatively prone to occur, which may cause deterioration in the endurance of the exhaust gas-purifying catalyst material. When the ratio is too high, the distance between the first oxide particles and the precious metal particles supported by the second oxide particles becomes relatively long. Accordingly, it becomes relatively difficult for the precious metals to benefit from the effects provided by the oxygen storage capacity of the first oxide efficiently, which may cause deterioration in the exhaust gas-purifying performance of the exhaust gas-purifying catalyst material.

The ratio $M_2/M_1$ of the total amount by mole $M_2$ of an element other than oxygen contained in the second oxide particles to the total amount by mole $M_1$ of an element other than oxygen contained in the first oxide particle is preferably within a range of 1/35 to 25/1 (mol/mol), and more preferably within a range of 1/1 to 10/1 (mol/mol). When the ratio is too low, the amount of the precious metals which can be introduced into the unit mass of the exhaust gas-purifying catalyst material is decreased, which may cause deterioration in its initial performance. When the ratio is too high, the aggregating of the second oxide particles becomes relatively easy to occur, which may cause deterioration in the endurance of the exhaust gas-purifying catalyst material.

When citric acid is added to the dispersion which may be used for manufacturing the exhaust gas-purifying catalyst material, the amount of the citric acid in the dispersion is preferably within a range of 3% by mass to 80% by mass, more preferably within a range of 5% by mass to 50% by mass, and still more preferably within a range of 5% by mass to 30% by mass based on the mass of the first oxide. By using the citric acid, the exhaust gas-purifying catalyst having more excellent exhaust gas-purifying performance can be produced. Although the reason is not necessarily clear, the present inventors presume as follows.

The citric acid is a multivalent organic acid having three carboxy groups. The carboxy groups can serve as carboxylates having a negative charge in a dispersion medium of the dispersion. A part of the carboxylates can electrically interact with the first oxide particle present in the dispersion. Another part of the carboxylates can electrically interact with the second oxide particle present in the dispersion. Therefore, the citric acid cross-links the first and the second oxide particles together by the above interactions so as to makes it possible to allow them close to each other.

In this case, typically, a plurality of citric acid molecules interact with one first oxide particle. These interactions not locally occur at the specific position on the surface of the first oxide particle but relatively uniformly occur at the unspecified position on the surface of the first oxide particle. Each of the citric acid molecules interacting with the first oxide particle can interact with the plurality of second oxide particles which are present in the dispersion via the carboxylate which is not used for the interaction with the first oxide particle.

Therefore, the cross-linkage between the first oxide particle and the second oxide particles provided by the citric acid relatively uniformly occurs on the surface of the first oxide particle. Accordingly, when the citric acid is used, it is possible to relatively uniformly disperse the second oxide supporting the precious metals on the first oxide particle. Therefore, in this case, deterioration in catalytic activity caused by the sintering or aggregating of the precious metal particles becomes less prone to occur. Namely, in this case, excellent exhaust gas-purifying performance can be achieved.

When other multivalent organic acid having a relatively large molecular weight is used in place of citric acid, the viscosity of the dispersion becomes excessively high, which may make it difficult to produce the catalyst. When citric acid is introduced into the dispersion in the form of a salt or complex of the constituent element of the first oxide and/or the second oxide, the following problem may occur. Namely, in this case, the low heat stability of the salt or complex may cause the aggregating of the compound containing the constituent element in the drying process of the dispersion, or the like.

The exhaust gas-purifying catalyst 100 shown in FIG. 1 is produced using the exhaust gas-purifying catalyst material 1 produced as described above. Specifically, for example, first, a dispersion containing the exhaust gas-purifying catalyst material 1 is prepared. Next, the substrate 200 is coated with the dispersion, and the coated film is then dried and fired to form the catalytic layer 300. Thus, the exhaust gas-purifying catalyst 100 is obtained.

Since the precious metal particles are supported by the second oxide particles having no oxygen storage capacity in the above-described exhaust gas-purifying catalyst material, the dispersibility of the precious metal particles is high, and the sintering of the precious metals is suppressed. Therefore, the metal state of the precious metals can be maintained, and the reactivity can be maintained. Since the second oxide particles having a relatively small average particle diameter $D_{av}$ and supporting precious metals are supported by the first oxide particle having an oxygen storage capacity, the distance between the precious metal and the first oxide is short, and the oxygen storage capacity of the first oxide is effectively utilized. Therefore, even when an atmosphere composition fluctuates, the precious metals maintain high performance. Furthermore, since the percentage of the precious metal particles being in contact with the acidic oxide particles is high, the poisoning of the precious metals by sulfur is efficiently suppressed.

Therefore, the technique described herein achieves both the maintenance of the metal state of the precious metal and the oxygen storage capacity, and suppresses the poisoning by sulfur, and thereby achieving excellent exhaust gas-purifying performance.

The exhaust gas-purifying catalyst including the catalytic layer provided on the substrate such as the monolithic catalyst has been described herein. However, the above-described exhaust gas-purifying catalyst material can also be used in a pellet catalyst.

Hereinafter, specific examples will be described.

Example 1: Production of Catalyst C1

A composite oxide of zirconium oxide and yttrium oxide was prepared. Specifically, there was prepared a composite oxide in which the atomic ratio of zirconium and yttrium was 9:1, and a median size D50 obtained by particle diameter distribution measurement using a laser diffraction-scattering method was 0.2 μm. Hereinafter, the composite oxide is referred to as an "oxide ZY1".

Next, 50 g (0.41 mol) of the oxide ZY1 was dispersed in 500 mL of deionized water. Then, a rhodium nitrate aqueous solution was added to the dispersion to allow the oxide ZY1 adsorb rhodium. Then, the dispersion was subjected to suction filtration. Thus, composite particles each containing rhodium and the oxide ZY1 supporting rhodium was prepared. Hereinafter, the composite particles are referred to as "composite particles CP1A".

The filtrate obtained by the suction filtration was subjected to inductively coupled plasma (ICP) spectral analysis. As a result, it was found that almost all of rhodium in the dispersion was present in the filter cake. Namely, the supporting efficiency of rhodium on the particles made of the oxide ZY1 was approximately 100%. The concentration and addition amount of rhodium nitrate aqueous solution were adjusted so that a rhodium content was 0.5% by mass based on the mass of an exhaust gas-purifying catalyst material.

A composite oxide of cerium oxide and zirconium oxide was prepared. Specifically, there was prepared a composite oxide in which the atomic ratio of cerium and zirconium was 6:4, and a median size D50 obtained by particle diameter distribution measurement using a laser diffraction-scattering method was 20 μm. Hereinafter, the composite oxide is referred to as an "oxide CZ1".

Next, the total amount of the composite particles CP1A were dispersed in 500 mL of deionized water. Then, 50 g (0.33 mol) of the oxide CZ1 and 5 g of citric acid were added to the dispersion, followed by sufficient stirring. Subsequently, the dispersion was dried. Specifically, the dispersion was heated to remove excess water. Then, this was fired in air at 500° C. for 1 hour. Thus, there was obtained composite particles in each of which the composite particles CP1A was supported by the particle made of the oxide CZ1. Hereinafter, the composite particles are referred to as "composite particles CP1B".

Next, the composite particles CP1B were dispersed in deionized water to prepare a dispersion. Titanium isopropoxide was dissolved in n-propyl alcohol to prepare a titanium-containing solution. A concentration of titanium in the titanium-containing solution converted into $TiO_2$ concentration was adjusted to 5% by mass. Then, the titanium-containing solution was added to the dispersion. The amount of the titanium-containing solution was adjusted so that a titanium content in the exhaust gas-purifying catalyst material converted into $TiO_2$ content was 1% by mass. Furthermore, the dispersion was sufficiently stirred to allow titanium-containing particles deposit on the composite particles CP1B.

Subsequently, the dispersion was filtered to obtain a filter cake, and the filter cake was washed using deionized water. Then, the solid after washing was dried at 110° C. Then, this was fired in air at 600° C. for 3 hours. As described above, the exhaust gas-purifying catalyst material was obtained in a powder form. Hereinafter, the powder is referred to as a "powder P1".

Then, the powder P1 was compression-molded. Furthermore, the molded product was ground to obtain 10 g of a pellet-shaped exhaust gas-purifying catalyst having a particle diameter of about 0.5 to 1.0 mm. Hereinafter, the catalyst is referred to as a "catalyst C1".

Example 2: Production of Catalyst C2

The same composite oxide as the oxide ZY1 was prepared except that a median size D50 was 0.05 μm. Hereinafter, the composite oxide is referred to as an "oxide ZY2".

The same composite oxide as the oxide CZ1 was prepared except that a median size D50 was changed to 1 μm. Hereinafter, the composite oxide is referred to as an "oxide CZ2".

An exhaust gas-purifying catalyst was produced by the same method as that described for a catalyst C1 except that 3.1 g (0.025 mol) of the oxide ZY2 was used in place of 50 g (0.41 mol) of the oxide ZY1 and 115 g (0.75 mol) of the oxide CZ2 was used in place of 50 g (0.33 mol) of the oxide CZ1. Hereinafter, the exhaust gas-purifying catalyst is referred to as a "catalyst C2".

Example 3: Production of Catalyst C3

The same composite oxide as the oxide ZY1 was prepared except that a median size D50 was 0.5 μm. Hereinafter, the composite oxide is referred to as an "oxide ZY3".

An exhaust gas-purifying catalyst was produced by the same method as that described for a, catalyst C1 except that 86 g (0.7 mol) of the oxide ZY3 was used in place of 50 g (0.41 mol) of the oxide ZY1 and the amount of an oxide CZ1 was changed to 15 g (0.1 mol) from 50 g (0.33 mol). Hereinafter, the exhaust gas-purifying catalyst is referred to as a "catalyst C3".

Example 4: Production of Catalyst C4

The same composite oxide as the oxide CZ1 was prepared except that a median size D50 was 100 μm. Hereinafter, the composite oxide is referred to as an "oxide CZ3".

An exhaust gas-purifying catalyst was produced by the same method as that described for a catalyst C1 except that 122 g (1 mol) of an oxide ZY3 was used in place of 50 g (0.41 mol) of an oxide ZY1 and 7.7 g (0.05 mol) of the oxide CZ3 was used in place of 50 g (0.33 mol) of the oxide CZ1. Hereinafter, the exhaust gas-purifying catalyst is referred to as a "catalyst C4".

Example 5: Production of Catalyst C5

An exhaust gas-purifying catalyst was produced by the same method as that described for a catalyst C4 except that a dinitrodiamine platinum nitrate aqueous solution was used in place of a rhodium nitrate aqueous solution. The concentration and amount of the dinitrodiamine platinum nitrate aqueous solution were adjusted so that a platinum content in an exhaust gas-purifying catalyst material was 0.5% by mass. Hereinafter, the exhaust gas-purifying catalyst is referred to as a "catalyst C5".

Example 6: Production of Catalyst C6

An exhaust gas-purifying catalyst was produced by the same method as that described for a catalyst C4 except that a palladium nitrate aqueous solution was used in place of a rhodium nitrate aqueous solution. The concentration and amount of the palladium nitrate aqueous solution were adjusted so that a palladium content in an exhaust gas-purifying catalyst material was 0.5% by mass. Hereinafter, the exhaust gas-purifying catalyst is referred to as a "catalyst C6".

Example 7: Production of Catalyst C7

An exhaust gas-purifying catalyst was produced by the same method as that described for a catalyst C2 except that the amount of an oxide CZ2 was changed to 134 g (0.875 mol) from 115 g (0.75 mol). Hereinafter, the exhaust gas-purifying catalyst is referred to as a "catalyst C7".

Example 8: Production of Catalyst C8

An exhaust gas-purifying catalyst was produced by the same method as that described for a catalyst C4 except that the amount of an oxide ZY3 was changed to 153 g (1.25 mol) from 122 g (1 mol). Hereinafter, the exhaust gas-purifying catalyst is referred to as a "catalyst C8".

Example 9: Production of Catalyst C9

A composite oxide of zirconium oxide and cerium oxide was prepared. Specifically, there was prepared a composite oxide in which the atomic ratio of cerium and zirconium was 3:7 and a median size D50 obtained by particle diameter distribution measurement using a laser diffraction-scattering method was 16 µm. Hereinafter, the composite oxide is referred to as an "oxide ZC1".

An exhaust gas-purifying catalyst was produced by the same method as that described for a catalyst C1 except that 46 g (0.33 mol) of the oxide ZC1 was used in place of 50 g (0.33 mol) of an oxide CZ1. Hereinafter, the exhaust gas-purifying catalyst is referred to as a "catalyst C9".

Example 10: Production of Catalyst C10

A composite oxide of cerium oxide and zirconium oxide was prepared. Specifically, there was prepared a composite oxide in which the atomic ratio of cerium and zirconium was 5:5 and a median size D50 obtained by particle diameter distribution measurement using a laser diffraction-scattering method was 23 µm. Hereinafter, the composite oxide is referred to as an "oxide CZ4". The oxide CZ4 had a pyrochlore structure.

An exhaust gas-purifying catalyst was produced by the same method as that described for a catalyst C1 except that 49 g (0.33 mol) of the oxide CZ4 was used in place of 50 g (0.33 mol) of an oxide CZ1. Hereinafter, the exhaust gas-purifying catalyst is referred to as a "catalyst C10".

Example 11 (Comparative Example): Production of Catalyst C11

The same composite oxide as the oxide ZY1 was prepared except that a median size D50 was 0.04 µm. Hereinafter, the composite oxide is referred to as an "oxide ZY4".

An exhaust gas-purifying catalyst was produced by the same method as that described for a catalyst C2 except that the oxide ZY4 was used in place of an oxide ZY2. Hereinafter, the exhaust gas-purifying catalyst is referred to as a "catalyst C11".

Example 12 (Comparative Example): Production of Catalyst C12

The same composite oxide as the oxide CZ1 was prepared except that a median size D50 was 0.9 µm. Hereinafter, the composite oxide is referred to as an "oxide CZ5".

An exhaust gas-purifying catalyst was produced by the same method as that described for a catalyst C2 except that the oxide CZ5 was used in place of an oxide CZ2. Hereinafter, the exhaust gas-purifying catalyst is referred to as a "catalyst C12".

Example 13 (Comparative Example): Production of Catalyst C13

An exhaust gas-purifying catalyst was produced by the same method as that described for a catalyst C2 except that an oxide ZY4 was used in place of an oxide ZY2 and 134 g (0.875 mol) an oxide CZ5 was used in place of 115 g (0.75 mol) of an oxide CZ2. Hereinafter, the exhaust gas-purifying catalyst is referred to as a "catalyst C13".

Example 14 (Comparative Example): Production of Catalyst C14

The same composite oxide as the oxide ZY1 was prepared except that a median size D50 was 0.6 µm. Hereinafter, the composite oxide is referred to as an "oxide ZY5".

An exhaust gas-purifying catalyst was produced by the same method as that described for a catalyst C4 except that the oxide ZY5 was used in place of an oxide ZY3. Hereinafter, the exhaust gas-purifying catalyst is referred to as a "catalyst C14".

Example 15 (Comparative Example): Production of Catalyst C15

The same composite oxide as the oxide CZ3 was prepared except that a median size D50 was 105 µm. Hereinafter, the composite oxide is referred to as an "oxide CZ6".

An exhaust gas-purifying catalyst was produced by the same method as that described for a catalyst C4 except that the oxide CZ6 was used in place of the oxide CZ3. Hereinafter, the exhaust gas-purifying catalyst is referred to as a "catalyst C15".

Example 16 (Comparative Example): Production of Catalyst C16

An exhaust gas-purifying catalyst was produced by the same method as that described for a catalyst C4 except that an oxide CZ6 was used in place of an oxide CZ3 and an oxide ZY5 was used in place of an oxide ZY3. Hereinafter, the exhaust gas-purifying catalyst is referred to as a "catalyst C16".

Example 17 (Comparative Example): Production of Catalyst C17

An exhaust gas-purifying catalyst was produced by the same method as that described for a catalyst C1 except that 50 g (0.33 mol) of an oxide CZ1 was used in place of 50 g (0.41 mol) of an oxide ZY1; 50 g (0.41 mol) of an oxide ZY1 was used in place of 50 g (0.33 mol) of an oxide CZ1; and citric acid was omitted. Hereinafter, the exhaust gas-purifying catalyst is referred to as a "catalyst C17".

Example 18 (Comparative Example): Production of Catalyst C18

An exhaust gas-purifying catalyst was produced by the same method as that described for a catalyst C1 except that citric acid was omitted. Hereinafter, the exhaust gas-purifying catalyst is referred to as a "catalyst C18".

Example 19: Production of Catalyst C19

86 g (0.37 mol) of zirconium oxynitrate (ZrO(NO$_3$)$_2$) and 11 g (0.04 mol) of yttrium nitrate (Y(NO$_3$)$_3$) were dissolved in 500 ml of deionized water. Namely, an aqueous solution containing zirconium and yttrium at the atomic ratio of 9:1 was prepared.

50 g (0.33 mol) of an oxide CZ1 was added to the aqueous solution. Then, 10% by mass of an ammonium hydroxide (NH$_4$OH) aqueous solution was dropped into the solution at room temperature. The addition of ammonium hydroxide aqueous solution was continued until the pH of the aqueous solution in the mixed solution became 9.0. Then, this was stirred for 60 minutes to allow oxide particles deposit on the particles made of the oxide CZ1. Then, the obtained solid was separated out by filtration to obtain a filter cake, and the filter cake was washed using deionized water.

Then, the solid after washing was dried at 110° C. Then, this was calcined in air at 600° C. for 3 hours. The obtained powder was ground using a mortar, followed by firing in air at 800° C. for 5 hours.

As described above, there was obtained composite particles in each of which the particles made of the composite oxide of zirconium oxide and yttrium oxide were supported by the particle made of the oxide CZ1. Hereinafter, the composite particles are referred to as "composite particles CP19A". The composite oxide supported by the particle made of the oxide CZ1 is referred to as an "oxide ZY6". The molar ratio of a zirconium element to a yttrium element in the oxide ZY6 was 9:1.

Next, 100 g of the composite particles CP19A were dispersed in 500 ml of deionized water. Then, a rhodium nitrate aqueous solution was added to the dispersion, followed by stirring. Then, the dispersion was subjected to suction filtration. Thus, rhodium was adsorbed on the composite particle CP19A. The composite particles are referred to as "composite particles CP19B".

The filtrate obtained by the suction filtration was subjected to ICP spectral analysis. As a result, it was found that almost all of rhodium in the dispersion was present in the filter cake. Namely, the supporting efficiency of rhodium was approximately 100%. The concentration and addition amount of rhodium nitrate aqueous solution were adjusted so that a rhodium content was 0.5% by mass based on the mass of an exhaust gas-purifying catalyst material.

Next, the total amount of the composite particles CP19B were dispersed in deionized water to prepare a dispersion. Titanium isopropoxide was dissolved in n-propyl alcohol to prepare a titanium-containing solution. A titanium concentration in the titanium-containing solution converted into TiO$_2$ concentration was adjusted to 5% by mass. Then, the titanium-containing solution was added to the dispersion. The amount of the titanium-containing solution was adjusted so that a titanium content in the exhaust gas-purifying catalyst material converted into TiO$_2$ content was 1% by mass. Furthermore, the dispersion was sufficiently stirred to allow titanium-containing particles deposit on the composite particles CP19B.

Subsequently, the dispersion was filtered to obtain a filter cake, and the filter cake was washed using deionized water. Then, the solid after washing was dried at 110° C. Then, this was fired in air at 600° C. for 3 hours. As described above, the exhaust gas-purifying catalyst material was obtained in a powder form. Hereinafter, the powder is referred to as a "powder P19".

An exhaust gas-purifying catalyst was produced by the same method as that described for a catalyst C1 except that the powder P19 was used in place of a powder P1. Hereinafter, the exhaust gas-purifying catalyst is referred to as a "catalyst C19".

Example 20: Production of Catalyst C20

A composite oxide of zirconium oxide and neodymium oxide was prepared. Specifically, there was prepared a composite oxide in which the atomic ratio of zirconium and neodymium was 9:1, and a median size D50 obtained by particle diameter distribution measurement using a laser diffraction-scattering method was 0.05 μm. Hereinafter, the composite oxide is referred to as an "oxide ZN1".

An exhaust gas-purifying catalyst was produced by the same method as that described for a catalyst C2 except that 3.2 g (0.025 mol) of the oxide ZN1 was used in place of 3.1 g (0.025 mol) of an oxide ZY2. Hereinafter, the exhaust gas-purifying catalyst is referred to as a "catalyst C20".

Example 21: Production of Catalyst C21

A composite oxide of zirconium oxide and praseodymium oxide was prepared. Specifically, there was prepared a composite oxide in which the atomic ratio of zirconium and praseodymium was 9:1, and a median size D50 obtained by particle diameter distribution measurement using a laser diffraction-scattering method was 0.05 μm. Hereinafter, the composite oxide is referred to as an "oxide ZP1".

An exhaust gas-purifying catalyst was produced by the same method as that described for a catalyst C2 except that 3.2 g (0.025 mol) of the oxide ZP1 was used in place of 3.1 g (0.025 mol) of an oxide ZY2. Hereinafter, the exhaust gas-purifying catalyst is referred to as a "catalyst C21".

Example 22: Production of Catalyst C22

A composite oxide of cerium oxide, zirconium oxide, and lanthanum oxide was prepared. Specifically, there was prepared a composite oxide in which the atomic ratio of cerium, zirconium, and lanthanum was 6:3:1, and a median size D50 obtained by particle diameter distribution measurement using a laser diffraction-scattering method was 1 μm. Hereinafter, the composite oxide is referred to as an "oxide CZL1".

An exhaust gas-purifying catalyst was produced by the same method as that described for a catalyst C2 except that 118 g (0.75 mol) of the oxide CZL1 was used in place of 115 g (0.75 mol) of an oxide CZ2. Hereinafter, the exhaust gas-purifying catalyst is referred to as a "catalyst C22".

Example 23: Production of Catalyst C23

A composite oxide of cerium oxide, zirconium oxide, lanthanum oxide, and yttrium oxide was prepared. Specifically, there was prepared a composite oxide in which the atomic ratio of cerium, zirconium, lanthanum, and yttrium was 6:2:1:1, and a median size D50 obtained by particle diameter distribution measurement using a laser diffraction-scattering method was 1 μm. Hereinafter, the composite oxide is referred to as an "oxide CZLY1".

An exhaust gas-purifying catalyst was produced by the same method as that described for a catalyst C2 except that 108 g (0.75 mol) of the oxide CZLY1 was used in place of 115 g (0.75 mol) of an oxide CZ2. Hereinafter, the exhaust gas-purifying catalyst is referred to as a "catalyst C23".

Example 24 (Comparative Example): Production of Catalyst C24

A composite oxide of cerium oxide and zirconium oxide was prepared. Specifically, there was prepared a composite oxide in which the atomic ratio of cerium and zirconium was 6:4, and a median size D50 obtained by particle diameter distribution measurement using a laser diffraction-scattering method was 0.05 μm. Hereinafter, the composite oxide is referred to as an "oxide CZ7".

A composite oxide of zirconium oxide and yttrium oxide was prepared. Specifically, there was prepared a composite oxide in which the atomic ratio of zirconium and yttrium was 9:1, and a median size D50 obtained by particle diameter distribution measurement using a laser diffraction-scattering method was 1 μm. Hereinafter, the composite oxide is referred to as an "oxide ZY7".

An exhaust gas-purifying catalyst was produced by the same method as that described for a catalyst C2 except that 3.8 g (0.025 mol) of the oxide CZ7 was used in place of 3.1 g (0.025 mol) of an oxide ZY2, and 92 g (0.75 mol) the oxide ZY7 was used in place of 115 g (0.75 mol) of an oxide CZ2. Hereinafter, the exhaust gas-purifying catalyst is referred to as a "catalyst C24".

Example 25 (Comparative Example): Production of Catalyst C25

A composite particle containing rhodium and an oxide ZY1 supporting rhodium was prepared by the same method as that described in Example 1. The composite particle is referred to as a "composite particle CP25A". The total amount of the composite particle CP25A was dispersed in 500 mL of deionized water. Then, 50 g (0.33 mol) of an oxide CZ1 and 5 g of citric acid were added to the dispersion, followed by sufficient stirring.

Subsequently, the dispersion was dried. Specifically, the dispersion was heated to remove excess water. Then, this was fired in air at 500° C. for 1 hour. Thus, a composite particle in which the composite particle CP25A was supported by the oxide CZ1 particle was obtained in a powder form as an exhaust gas-purifying catalyst material. Hereinafter, the powder is referred to as a "powder P25".

The powder P25 was compression-molded. Furthermore, the molded product was ground to obtain 10 g of a pellet-shaped exhaust gas-purifying catalyst having a particle diameter of about 0.5 to 1.0 mm. Hereinafter, the exhaust gas-purifying catalyst is referred to as a "catalyst C25".

Example 26: Production of Catalyst C26

An exhaust gas-purifying catalyst was produced by the same method as that described for a catalyst C1 except that a titanium content in an exhaust gas-purifying catalyst material was 0.1% by mass in terms of $TiO_2$. Hereinafter, the exhaust gas-purifying catalyst is referred to as a "catalyst C26".

Example 27: Production of Catalyst C27

An exhaust gas-purifying catalyst was produced by the same method as that described for a catalyst C1 except that a titanium content in an exhaust gas-purifying catalyst material was 0.5% by mass in terms of $TiO_2$. Hereinafter, the exhaust gas-purifying catalyst is referred to as a "catalyst C27".

Example 28: Production of Catalyst C28

An exhaust gas-purifying catalyst was produced by the same method as that described for a catalyst C1 except that a titanium content in an exhaust gas-purifying catalyst material was 3% by mass in terms of $TiO_2$. Hereinafter, the exhaust gas-purifying catalyst is referred to as a "catalyst C28".

Example 29: Production of Catalyst C29

An exhaust gas-purifying catalyst was produced by the same method as that described for a catalyst C1 except that a titanium content in an exhaust gas-purifying catalyst material was 5% by mass in terms of $TiO_2$. Hereinafter, the exhaust gas-purifying catalyst is referred to as a "catalyst C29".

Example 30: Production of Catalyst C30

Tetramethoxysilane was dissolved in n-propyl alcohol to prepare an alcohol solution of tetramethoxysilane. An exhaust gas-purifying catalyst was produced by the same method as that described for a catalyst C1 except that the alcohol solution of tetramethoxysilane was used in place of a titanium-containing solution. The concentration of the tetramethoxysilane in the alcohol solution converted into $SiO_2$ concentration was 5% by mass. The addition amount of the alcohol solution was adjusted to 5% by mass converted into $SiO_2$ amount based on the mass of a composite particle CP1B. The amount of the alcohol solution was adjusted so that a silicon content in an exhaust gas-purifying catalyst material converted into $SiO_2$ content was 1% by mass. Hereinafter, the exhaust gas-purifying catalyst is referred to as a "catalyst C30".

Example 31: Production of Catalyst C31

A composite particle containing rhodium and an oxide ZY1 supporting rhodium was prepared by the same method as that described in Example 1. The composite particle is referred to as a "composite particle CP31A". The total amount of the composite particle CP31A was dispersed in 500 mL of deionized water. Then, 50 g (0.33 mol) of an oxide CZ1 and 5 g of citric acid were added to the dispersion, followed by sufficient stirring.

Subsequently, the dispersion was dried. Specifically, the dispersion was heated to remove excess water. Then, this was fired in air at 500° C. for 1 hour. Thus, composite particles in each of which the composite particles CP31A were supported by the oxide CZ1 particle were obtained. Hereinafter, the composite particles are referred to as a "composite particles CP31B".

Next, the composite particles CP31B were dispersed in deionized water. To the dispersion, a nitric acid aqueous solution of 30% by mass separately prepared was added under room temperature until the pH reached 3. Then, tungsten acid was added thereto. Then, the dispersion were stirred at 70° C. for 60 minutes. Subsequently, the dispersion was dried. Specifically, the dispersion was heated to remove excess water. Then, this was fired in air at 600° C. for 3 hours. The amount of the tungsten acid was adjusted so that a tungsten content in an exhaust gas-purifying catalyst material converted into $WO_3$ content was 1% by mass. As described above, the exhaust gas-purifying catalyst material was obtained in a powder form. Hereinafter, the powder is referred to as a "powder P31".

Then, the powder P31 was compression-molded. Furthermore, the molded product was ground to obtain 10 g of a pellet-shaped exhaust gas-purifying catalyst having a particle diameter of about 0.5 to 1.0 mm. Hereinafter, the exhaust gas-purifying catalyst is referred to as a "catalyst C31".

Example 32: Production of Catalyst C32

Composite particles containing rhodium and an oxide ZY1 supporting rhodium was prepared by the same method as that described in Example 1. Hereinafter, the composite particles are referred to as "composite particles CP32A".

The composite particles CP32A were dispersed in deionized water to prepare a dispersion. Titanium isopropoxide was dissolved in n-propyl alcohol to prepare a titanium-containing solution. A titanium concentration in the titanium-containing solution converted into $TiO_2$ concentration was adjusted to 5% by mass. The titanium-containing solution was added to the dispersion, and the mixed-solution was stirred. The amount of the titanium-containing solution was adjusted so that a titanium content in the exhaust gas-purifying catalyst material converted into $TiO_2$ content was 1% by mass. Thus, a titanium-containing particle was deposited on the composite particle CP32. Hereinafter, the composite particles each containing titanium and the composite particle CP32A supporting the titanium are referred to as "composite particles CP32B".

Subsequently, the dispersion was filtered to obtain a filter cake, and the filter cake was washed using deionized water. Then, the solid after washing was dried at 110° C. Then, this was fired in air at 600° C. for 3 hours.

Then, the total amount of the obtained powder was dispersed in 500 ml of deionized water. Then, 50 g (0.33 mol) of an oxide CZ1 and 5 g of citric acid were added to the dispersion, followed by sufficient stirring.

Subsequently, the dispersion was dried. Specifically, the dispersion was heated to remove excess water. Then, this was fired in air at 500° C. for 1 hour. Thus, the composite particles CP32 were supported by particles made of the oxide CZ1. Thereby, the exhaust gas-purifying catalyst material was obtained in a powder form. Hereinafter, the powder is referred to as a "powder P32".

Then, the powder P32 was compression-molded. Furthermore, the molded product was ground to obtain 10 g of a pellet-shaped exhaust gas-purifying catalyst having a particle diameter of about 0.5 to 1.0 mm. Hereinafter, the exhaust gas-purifying catalyst is referred to as a "catalyst C32".

Example 33 (Comparative Example): Production of Catalyst C33

50 g (0.33 mol) of an oxide CZ1 was dispersed in deionized water. Titanium isopropoxide was dissolved in n-propyl alcohol to prepare a titanium-containing solution. A titanium concentration in the titanium-containing solution converted into $TiO_2$ concentration was adjusted to 5% by mass. The titanium-containing solution was added to the dispersion, followed by stirring. The amount of the titanium-containing solution was adjusted so that a titanium content in the exhaust gas-purifying catalyst material converted into $TiO_2$ content was 1% by mass. Thus, a titanium-containing particle was deposited on the oxide CZ1.

Subsequently, the dispersion was filtered to obtain a filter cake, and the filter cake was washed using deionized water. Then, the solid after washing was dried at 110° C. Then, this was fired in air at 600° C. for 3 hours. Thus, a composite particle in which the titanium-containing particle was supported by the oxide CZ1 was obtained. Hereinafter, the composite particle is referred to as a "composite particle CP33A".

50 g (0.41 mol) of an oxide ZY1 was dispersed in 500 mL of deionized water. Then, a rhodium nitrate aqueous solution was added to the dispersion to allow the oxide ZY1 adsorb rhodium. Then, the dispersion was subjected to suction filtration. Thus, composite particles each containing rhodium and the oxide ZY1 supporting rhodium were prepared. The composite particles are referred to as "composite particles CP33B".

The filtrate obtained by the suction filtration was subjected to ICP spectral analysis. As a result, it was found that almost all of rhodium in the dispersion was present in the filter cake. Namely, the supporting efficiency of rhodium on the particle made of the oxide ZY1 was approximately 100%. The concentration and addition amount of rhodium nitrate aqueous solution were adjusted so that a rhodium content was 0.5% by mass based on the mass of an exhaust gas-purifying catalyst material.

Next, the total amount of the composite particles CP33B were dispersed in 500 mL of deionized water. Then, the total amount of the composite particles CP33A and 5 g of citric acid were added to the dispersion, followed by sufficient stirring.

Subsequently, the dispersion was dried. Specifically, the dispersion was heated to remove excess water. Then, this was fired in air at 500° C. for 1 hour. Thus, composite particles in each of which the composite particles CP33B were supported by the composite particle CP33A were obtained in a powder form as the exhaust gas-purifying catalyst material. Hereinafter, the powder is referred to as a "powder P33".

Then, the powder P33 was compression-molded. Furthermore, the molded product was ground to obtain 10 g of a pellet-shaped exhaust gas-purifying catalyst having a particle diameter of about 0.5 to 1.0 mm. Hereinafter, the exhaust gas-purifying catalyst is referred to as a "catalyst C33".

Example 34 (Comparative Example): Production of Catalyst C34

Composite particles each containing rhodium and an oxide ZY1 supporting rhodium were obtained by the same method as that described in Example 1. Hereinafter, the composite particles are referred to as "composite particles CP34A".

Furthermore, composite particles in each of which the composite particles CP34 were support by a particle made of an oxide CZ1 was obtained by the same method as that described in Example 1. Hereinafter, the composite particles are referred to as "composite particles CP34B".

The composite particles CP34B and TiO$_2$ particles having a median size D50 of 20 μm were added to deionized water, and the dispersion was stirred. The amounts of the composite particles CP34B and TiO$_2$ particles were adjusted so that a titanium content in an exhaust gas-purifying catalyst material converted into TiO$_2$ content was 1% by mass.

Then, the dispersion was dried. Specifically, the dispersion was heated to remove excess water. Then, this was fired in air at 600° C. for 3 hours.

Thus, a powder in which the composite particles CP34 and the titanium oxide particles were mixed was obtained as the exhaust gas-purifying catalyst material. As described above, the exhaust gas-purifying catalyst material was obtained in a powder form. Hereinafter, the powder is referred to as a "powder P34".

Then, the powder P34 was compression-molded. Furthermore, the molded product was ground to obtain 10 g of a pellet-shaped exhaust gas-purifying catalyst having a particle diameter of about 0.5 to 1.0 mm. Hereinafter, the exhaust gas-purifying catalyst is referred to as a "catalyst C34".

Example 35: Production of Catalyst C35

Composite particles each containing rhodium and an oxide ZY1 supporting rhodium was prepared by the same method as that described in Example 1. Hereinafter, the composite particles are referred to as "composite particles CP35A".

The total amount of the composite particles CP35A were dispersed in 500 mL of deionized water. Furthermore, acetic acid was added thereto to adjust the pH to from 5 to 6. Titanium isopropoxide was dissolved in n-propyl alcohol to prepare a titanium-containing solution. A titanium concentration in the titanium-containing solution converted into TiO$_2$ concentration was adjusted to 5% by mass. The titanium-containing solution was added to the dispersion, followed by stirring. The amount of the titanium-containing solution was adjusted so that a titanium content in the exhaust gas-purifying catalyst material converted into TiO$_2$ content was 1% by mass. Thus, the titanium-containing particles were deposited on the composite particles CP35A. Hereinafter, the composite particles each containing titanium and the composite particle CP35A supporting titanium are referred to as "composite particles CP35B".

Next, 50 g (0.33 mol) of an oxide CZ1 was introduced into the dispersion containing the composite particles CP35B, followed by stirring. Subsequently, the dispersion was dried. Specifically, the dispersion was heated to remove excess water. Then, this was fired in air at 500° C. for 1 hour. Thus, the composite particles CP35B were supported by the particles made of the oxide CZ1. As described above, the exhaust gas-purifying catalyst material was obtained in a powder form. Hereinafter, the powder is referred to as a "powder P35".

Then, the powder P35 was compression-molded. Furthermore, the molded product was ground to obtain 10 g of a pellet-shaped exhaust gas-purifying catalyst having a particle diameter of about 0.5 to 1.0 mm. Hereinafter, the exhaust gas-purifying catalyst is referred to as a "catalyst C35".

<Measurement of Average Particle Diameter $D_{av}$>

SEM observations were performed on the catalysts C1 to C35 at 2,500-fold to 10,000-fold magnification. As for each catalyst, the average particle diameters $D_{av}$ of the oxide particles were determined by the method described above. The results are summarized in Tables 1 to 4 below together with other property values.

TABLE 1

| Catalyst | Precious metal particle Composition | Precious metal particle Content (mass %) | 1st oxide particle Composition | 1st oxide particle $D_{av}$ (μm) | 2nd oxide particle Composition | 2nd oxide particle $D_{av}$ (μm) | $M_2/M_1$ (mol/mol) | Acidic oxide particle Composition | Acidic oxide particle Content (mass %) | Coverage (%) | Correlation coefficient ρ | 50% purification temperature HC | 50% purification temperature NO$_x$ |
|---|---|---|---|---|---|---|---|---|---|---|---|---|---|
| C1 | Rh | 0.5 | CZ | 19 | ZY | 0.2 | 1.24/1 | TiO$_2$ | 1 | 85 | 0.75 | 314 | 312 |
| C2 | Rh | 0.5 | CZ | 1 | ZY | 0.05 | 1/30 | TiO$_2$ | 1 | 43 | 0.70 | 323 | 318 |
| C3 | Rh | 0.5 | CZ | 1 | ZY | 0.5 | 7/1 | TiO$_2$ | 1 | 88 | 0.74 | 317 | 314 |
| C4 | Rh | 0.5 | CZ | 90 | ZY | 0.5 | 20/1 | TiO$_2$ | 1 | 92 | 0.71 | 325 | 320 |
| C5 | Pt | 0.5 | CZ | 91 | ZY | 0.5 | 20/1 | TiO$_2$ | 1 | 91 | 0.71 | 411 | 418 |
| C6 | Pd | 0.5 | CZ | 91 | ZY | 0.5 | 20/1 | TiO$_2$ | 1 | 92 | 0.71 | 402 | 383 |
| C7 | Rh | 0.5 | CZ | 1 | ZY | 0.05 | 1/35 | TiO$_2$ | 1 | 34 | 0.62 | 327 | 322 |
| C8 | Rh | 0.5 | CZ | 90 | ZY | 0.5 | 25/1 | TiO$_2$ | 1 | 98 | 0.66 | 329 | 328 |
| C9 | Rh | 0.5 | ZC | 16 | ZY | 0.2 | 1.24/1 | TiO$_2$ | 1 | 86 | 0.76 | 317 | 308 |
| C10 | Rh | 0.5 | CZ' | 21 | ZY | 0.2 | 1.24/1 | TiO$_2$ | 1 | 85 | 0.75 | 309 | 303 |

TABLE 2

| Catalyst | Precious metal particle Composition | Precious metal particle Content (mass %) | 1st oxide particle Composition | 1st oxide particle $D_{av}$ (μm) | 2nd oxide particle Composition | 2nd oxide particle $D_{av}$ (μm) | $M_2/M_1$ (mol/mol) | Acidic oxide particle Composition | Acidic oxide particle Content (mass %) | Coverage (%) | Correlation coefficient ρ | 50% purification temperature HC | 50% purification temperature NO$_x$ |
|---|---|---|---|---|---|---|---|---|---|---|---|---|---|
| C11 | Rh | 0.5 | CZ | 1 | ZY | 0.04 | 1/30 | TiO$_2$ | 1 | 36 | 0.65 | 336 | 333 |
| C12 | Rh | 0.5 | CZ | 0.9 | ZY | 0.05 | 1/30 | TiO$_2$ | 1 | 36 | 0.68 | 336 | 333 |
| C13 | Rh | 0.5 | CZ | 0.9 | ZY | 0.04 | 1/35 | TiO$_2$ | 1 | 32 | 0.56 | 349 | 346 |
| C14 | Rh | 0.5 | CZ | 90 | ZY | 0.6 | 20/1 | TiO$_2$ | 1 | 97 | 0.64 | 341 | 337 |
| C15 | Rh | 0.5 | CZ | 97 | ZY | 0.5 | 20/1 | TiO$_2$ | 1 | 97 | 0.65 | 342 | 338 |

TABLE 2-continued

| | Precious metal particle | | 1st oxide particle | | 2nd oxide particle | | | Acidic oxide particle | | Coverage | Correlation coefficient | 50% purification temperature | |
|---|---|---|---|---|---|---|---|---|---|---|---|---|---|
| Catalyst | Com-position | Content (mass %) | Composition | $D_{av}$ (μm) | Composition | $D_{av}$ (μm) | $M_2/M_1$ (mol/mol) | Composition | Content (mass %) | (%) | ρ | HC | $NO_x$ |
| C16 | Rh | 0.5 | CZ | 97 | ZY | 0.6 | 20/1 | $TiO_2$ | 1 | 98 | 0.55 | 354 | 349 |
| C17 | Rh | 0.5 | CZ | 20 | ZY | 0.2 | 1.24/1 | $TiO_2$ | 1 | 93 | 0.14 | 383 | 376 |
| C18 | Rh | 0.5 | CZ | 20 | ZY | 0.2 | 1.24/1 | $TiO_2$ | 1 | 24 | 0.24 | 373 | 363 |
| C19 | Rh | 0.5 | CZ | 20 | ZY | 0.4 | 1.24/1 | $TiO_2$ | 1 | 50 | 0.71 | 329 | 327 |
| C20 | Rh | 0.5 | CZ | 1 | ZN | 0.05 | 1/30 | $TiO_2$ | 1 | 43 | 0.68 | 326 | 319 |

TABLE 3

| | Precious metal particle | | 1st oxide particle | | 2nd oxide particle | | | Acidic oxide particle | | Coverage | Correlation coefficient | 50% purification temperature | |
|---|---|---|---|---|---|---|---|---|---|---|---|---|---|
| Catalyst | Com-position | Content (mass %) | Com-position | $D_{av}$ (μm) | Composition | $D_{av}$ (μm) | $M_2/M_1$ (mol/mol) | Composition | Content (mass %) | (%) | ρ | HC | $NO_x$ |
| C21 | Rh | 0.5 | CZ | 1 | ZP | 0.05 | 1/30 | $TiO_2$ | 1 | 43 | 0.67 | 329 | 331 |
| C22 | Rh | 0.5 | CZL | 1 | ZY | 0.05 | 1/30 | $TiO_2$ | 1 | 46 | 0.71 | 318 | 319 |
| C23 | Rh | 0.5 | CZLY | 1 | ZY | 0.05 | 1/30 | $TiO_2$ | 1 | 44 | 0.72 | 315 | 312 |
| C24 | Rh | 0.5 | CZ | 0.05 | ZY | 1 | 1/30 | $TiO_2$ | 1 | 40 | 0.67 | 385 | 379 |
| C25 | Rh | 0.5 | CZ | 20 | ZY | 0.2 | 1.24/1 | $TiO_2$ | 0 | 84 | — | 367 | 358 |
| C26 | Rh | 0.5 | CZ | 19 | ZY | 0.2 | 1.24/1 | $TiO_2$ | 0.1 | 83 | 0.75 | 321 | 316 |
| C27 | Rh | 0.5 | CZ | 20 | ZY | 0.2 | 1.24/1 | $TiO_2$ | 0.5 | 85 | 0.78 | 318 | 313 |
| C28 | Rh | 0.5 | CZ | 20 | ZY | 0.2 | 1.24/1 | $TiO_2$ | 3 | 86 | 0.72 | 322 | 317 |
| C29 | Rh | 0.5 | CZ | 20 | ZY | 0.2 | 1.24/1 | $TiO_2$ | 5 | 88 | 0.66 | 329 | 327 |
| C30 | Rh | 0.5 | CZ | 19 | ZY | 0.2 | 1.24/1 | $SiO_2$ | 1 | 88 | 0.71 | 324 | 319 |

TABLE 4

| | Precious metal particle | | 1st oxide particle | | 2nd oxide particle | | | Acidic oxide particle | | Coverage | Correlation coefficient | 50% purification temperature | |
|---|---|---|---|---|---|---|---|---|---|---|---|---|---|
| Catalyst | Com-position | Content (mass %) | Composition | $D_{av}$ (μm) | Composition | $D_{av}$ (μm) | $M_2/M_1$ (mol/mol) | Composition | Content (mass %) | (%) | ρ | HC | $NO_x$ |
| C31 | Rh | 0.5 | CZ | 20 | ZY | 0.2 | 1.24/1 | $WO_3$ | 1 | 84 | 0.74 | 323 | 316 |
| C32 | Rh | 0.5 | CZ | 20 | ZY | 0.2 | 1.24/1 | $TiO_2$ | 1 | 72 | 0.77 | 326 | 323 |
| C33 | Rh | 0.5 | CZ | 20 | ZY | 0.2 | 1.24/1 | $TiO_2$ | 1 | 56 | 0.41 | 352 | 348 |
| C34 | Rh | 0.5 | CZ | 20 | ZY | 0.2 | 1.24/1 | $TiO_2$ | 1 | 84 | 0.11 | 359 | 354 |
| C35 | Rh | 0.5 | CZ | 19 | ZY | 0.2 | 1.24/1 | $TiO_2$ | 1 | 83 | 0.86 | 295 | 294 |

<Coverage>

As for the catalysts C1 to C35, the coverage was determined by the method described above. The results are summarized in Tables 1 to 4 above.

<Evaluation of Exhaust Gas-Purifying Performance>

First, each of the catalysts C1 to C35 was subjected to an endurance test. Specifically, each catalyst was placed in a flow-type endurance test apparatus, and a gas containing nitrogen as a main component was fed into a catalyst bed at a flow rate of 500 mL/min for 30 hours. During this period, the temperature of the catalyst bed was held at 950° C. As the gas fed into the catalyst bed, a lean gas produced by adding 2% of oxygen ($O_2$) to a gas produced by adding 0.02% of sulfur dioxide ($SO_2$) to nitrogen ($N_2$), and a rich gas produced by adding 4% of carbon monoxide (CO) to a gas produced by adding 0.02% of $SO_2$ to $N_2$ were used. These gases were alternated every 5 minutes.

Then, as for the catalysts C1 to C35 after the endurance test, HC- and $NO_x$-purifying performances were evaluated. Specifically, first, each catalyst was placed in a normal pressure fixed bed circulation reaction system. Then, the temperature of the catalyst bed was raised from 100° C. to 500° C. at the temperature increase rate of 12° C./minute and the exhaust gas-purifying ratio was continuously measured while a model gas was made to flow through the catalyst bed. A gas containing stoichiometric equivalent amount of an oxidizing component ($O_2$ and $NO_x$) and a reducing component (CO, HC, hydrogen ($H_2$)) was used as the model gas.

The results are summarized in Tables 1 to 4 above. The lowest temperature of the catalyst bed at which 50% or more of the components contained in the model gas has been purified is described in the column indicated as "50% purification temperature" in Table 1.

<Evaluation of Correlation Coefficient ρ>

As for the catalysts C1 to C35, the correlation coefficient ρ was determined by the method described above. The results are summarized in Tables 1 to 4 above.

<Results>

As shown in Tables 1 to 4, the catalysts C1 to C10, C19 to C23, C26 to C32, and C35 achieved more excellent exhaust gas-purifying performance than that of the C11 to C18, C24, C25, C33, and C34. The catalysts C5 and C6 had a relatively high 50% purification temperature. This is because the catalysts C5 and C6 contain different precious metals from those of the catalyst C1 or the like.

As is apparent from comparisons between the catalysts C1 and C18, when a catalyst was produced using citric acid, a higher correlation coefficient ρ and more excellent exhaust gas-purifying performance could be achieved as compared with the case where citric acid was not used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst material comprising:
   first oxide particles having an average particle diameter $D_{av}$ of 1 μm to 95 μm and having an oxygen storage capacity;
   second oxide particles having an average particle diameter $D_{av}$ of 0.05 μm to 0.5 μm, containing a metal element, and having no oxygen storage capacity;
   precious metal particles; and
   acidic oxide particles,
   wherein the exhaust gas-purifying catalyst material has a correlation coefficient ρ of 0.45 or more, the correlation coefficient ρ being calculated from the following formula (1) using first characteristic X-ray intensity for the metal element contained in the second oxide particle, second characteristic X-ray intensity for an element other than oxygen contained in the acidic oxide particle, and third characteristic X-ray intensity for a precious metal element contained in the precious metal particle each obtained through characteristic X-ray measurement by energy dispersive X-ray spectroscopic method on a 500 nm-length straight section on the exhaust gas-purifying catalyst material:

$$\rho = \frac{C(SP, AC/PM)}{\sigma(SP) \times \sigma(AC/PM)} \quad (1)$$

wherein in the formula (1), the covariance C(SP,AC/PM), standard deviation σ(SP), and standard deviation σ(AC/PM) are calculated from to the following formulae (2), (3), and (4), respectively, $$C(SP, AC/PM) = \frac{1}{n}\sum_{m=1}^{n}\left\{[I_{SP}(m) - I_{SP}(AV)] \times \left[\frac{I_{AC}(m)}{I_{PM}(m)} - \frac{I_{AC}(AV)}{I_{PM}(AV)}\right]\right\} \quad (2)$$

$$\sigma(SP) = \sqrt{\frac{1}{n}\sum_{m=1}^{n}[I_{SP}(m) - I_{SP}(AV)]^2} \quad (3)$$

$$\sigma(AC/PM) = \sqrt{\frac{1}{n}\sum_{m=1}^{n}\left[\frac{I_{AC}(m)}{I_{PM}(m)} - \frac{I_{AC}(AV)}{I_{PM}(AV)}\right]^2} \quad (4)$$

in the formulae (2) to (4), $I_{SP}(m)$, $I_{AC}(m)$, and $I_{PM}(m)$ respectively represent the first characteristic X-ray intensity, the second characteristic X-ray intensity, and the third characteristic X-ray intensity each obtained for a m-th straight section among 25 straight sections arranged in line in the 500 nm-length straight section and each having a length of 20 nm; $I_{SP}(Av)$, $I_{AC}(Av)$, and $I_{PM}(Av)$ respectively represent an average value of the first characteristic X-ray intensities, an average value of the second characteristic X-ray intensities, and an average value of the third characteristic X-ray intensities obtained for the 500 nm-length straight section; and n is 25.

2. The exhaust gas-purifying catalyst material according to claim 1, wherein 34% to 98% of surfaces of the first oxide particles is covered with the second oxide particles or the acidic oxide particles.

3. The exhaust gas-purifying catalyst material according to claim 1, wherein a ratio $M_2/M_1$ of the total amount by mole $M_2$ of an element other than oxygen contained in the second oxide particles to the total amount by mole $M_1$ of an element other than oxygen contained in the first oxide particles is within a range of 1/35 to 25/1.

4. The exhaust gas-purifying catalyst material according to claim 1, wherein the acidic oxide particles are made of one or more oxides selected from the group consisting of titanium oxide, silicon oxide, and tungsten oxide.

5. The exhaust gas-purifying catalyst material according to claim 1, wherein a content of the acidic oxide particles is within a range of 0.1% to 5% by mass.

6. The exhaust gas-purifying catalyst material according to claim 1, wherein the first oxide particles are made of a composite oxide containing cerium and zirconium.

7. The exhaust gas-purifying catalyst material according to claim 1, wherein the second oxide particles are made of a zirconium-containing oxide.

8. An exhaust gas-purifying catalyst comprising:
   a substrate; and
   a catalytic layer provided on the substrate and containing the exhaust gas-purifying catalyst material according to claim 1.

* * * * *